United States Patent
Murakami et al.

(10) Patent No.: US 6,362,468 B1
(45) Date of Patent: Mar. 26, 2002

(54) OPTICAL UNIT FOR DETECTING OBJECT AND COORDINATE INPUT APPARATUS USING SAME

(75) Inventors: Azuma Murakami; Yasuji Ogawa; Yasuhiro Fukuzaki, all of Saitama (JP)

(73) Assignee: Saeilo Japan, Inc. (JP)

( * ) Notice: Subject to any disclaimer, the term of this patent is extended or adjusted under 35 U.S.C. 154(b) by 0 days.

(21) Appl. No.: 09/569,321

(22) Filed: May 11, 2000

(30) Foreign Application Priority Data

Jun. 10, 1999 (JP) .......................................... 11-164123

(51) Int. Cl.[7] .............................................. G06M 7/00
(52) U.S. Cl. ...................................... 250/221; 340/555
(58) Field of Search .............................. 250/221, 222.1, 250/227.11, 227.13, 227.14; 356/375, 387, 386; 340/555, 556, 557

(56) References Cited

U.S. PATENT DOCUMENTS 6,100,538 A * 8/2000 Ogawa ................... 250/559.29
6,160,479 A * 12/2000 Ahlen et al. ................. 340/555

FOREIGN PATENT DOCUMENTS

| JP | 62-5428 | 1/1987 |
| JP | 09319501 | 12/1997 |
| JP | 11085377 | 3/1999 |
| JP | 110885399 | 3/1999 |

* cited by examiner

Primary Examiner—David P. Porta
Assistant Examiner—Jurie Yun
(74) Attorney, Agent, or Firm—Wells, St. John, Roberts, Gregory & Matkin

(57) ABSTRACT

An object detecting optical unit for detecting a direction or a position of an object placed on a detecting plane surface is disclosed. The optical unit detects existence or non existence of a retroreflective light reflected by a retroreflective member. A light projection device is formed by a plurality of light sources and corresponding lenses, arranged in to form a fan shaped projection pattern parallel to the detecting plane surface, the projection pattern being as if projected from a virtual one point light source. A light receiving device is included which has a slit or lens and linear photoreceptive group, arranged in such a manner as to form a light receiving pattern with a view field corresponding to the fan shaped projection pattern. A position coordinate input apparatus using the optical unit is also disclosed.

10 Claims, 7 Drawing Sheets

INEFFECTIVE LIGHT

OPTICAL UNIT FOR DETECTING OBJECT AND COORDINATE INPUT APPARATUS USING SAME

BACKGROUND OF THE INVENTION (1) Field of the Invention

The present invention relates to an optical unit for detecting an object, and its application to a coordinate input apparatus, with a special reference made to the optical unit for detecting an object wherein a plurality of light emitting diodes are used to form a fan shape floodlight pattern, and its application for the coordinate input apparatus.

(2) Description of the Related Art

In digitizers and tablets incorporated as a coordinate input apparatus in processing units, there are various systems for detecting an angle (direction) or a position of an object. Examples are the pressure sensitive resistance membrane system, capacitance system, electromagnetic induction system and the like. There is also an optical system among non-contact systems that is capable of detecting the angle or the position of the object. In FIG. 9, a typical configuration of an optical unit used in the position detecting device of an object in accordance with conventional optical systems is shown. Light emitted from a point light source 91 is converted to a planar fan shaped light flux by a cylindrical lens 92. Then it is reflected in a 90 degree angle by a half mirror 93, and then is incident on a retroreflective member 95 which possesses retroreflective characteristics. Here, the retroreflective characteristics are the characteristics of a reflection whereby the incident light returns straight back in the direction in which the light was incident. The light incident on the retroreflective member 95 is reflected in the direction reverse to the incident direction, passes through the half mirror 93, is condensed by a lens 96 and then projected to a linear charge coupled device (CCD) 97. In the case of a position detecting device using a light interruption system wherein a retroreflective member is provided at an edge of the effective region, and a shadow is used, as the object interrupts the light, in order to detect the direction of the object, the direction of the shadow can be detected from the distribution of the output signals of the linear CCD 97. However, since this example uses the half mirror 93, the attenuation or loss of the light at the time of reflection at and at the time of passing through the half mirror 93 cannot be avoided. Also, as illustrated in FIG. 10, there is a system, which uses a reflecting mirror 94 with a slit in lieu of the half mirror in the conventional optical unit shown in FIG. 9. A problem in this case is that only a portion of the light reflected by the retroreflective member can be used as input light to the linear CCD.

As another example of an object detecting device, which detects the angle or the position of the object optically, there is one disclosed in Japanese Patent Application Laid-Open No. S62-5428. This device is configured such that the two optical units respectively project light in a fan shape, parallel to a coordinate detecting surface, and the linear photoreceptive sensor receive the retroreflective light from a retroreflective surface provided at an edge portion of the coordinate detecting surface, the edge portion being opposite to the location where the two optical units are provided. By interrupting a portion of the light with an object, a finger or a pen, the device detects the direction of the shadow. By conducting this detection from the two optical units which are arranged in the predetermined positions, the coordinates of the finger or the pen can be calculated accurately with the triangulation principle explained later.

Almost the same prior art system is disclosed in the U.S. Pat. No. 4,507,557. This example configures the system with a stand-alone light emitting diode with broad directivity and high-power, in which the light emitting diode is used as a stand-alone light source without inolving a lens or a mirror.

In Japanese Patent Application Laid-Open No. H9-319501, a system which uses a position sensing device (PSD) as a photoreceptive sensor instead of a linear CCD is disclosed. PSD is a component which generates different electric signals by light-receptive spots, having one-to-one correspondence between the light-receptive spot on the PSD and the light-receptive angle of the reflective light from the pen. This light is, then, incident on the angle detective means, so that by predetermining the correspondent relationships among the light-receptive angle, the light-receptive spot on the PSD and the electric signal that the PSD generates, then from the value of the electric signal directly measured by the PSD, the pointing position of the pen can be identified. In this prior art, an LED and a cylindrical lens are arranged in such a way as to cause the emitted light from the LED to become a beam parallel to the coordinate input surface by the cylindrical lens which is placed right in front of the LED. In these types of optical object detecting devices, the field of the photoreceptive sector becomes a fan shape plane, especially, in the case of the detecting device wherein an array of a linear photoreceptor is provided at the photoreceptive sector so that the light from the object or the direction of the shadow of the object is detected. Then, in the case of providing the retroreflective member on the object and using the retroreflective light from the object itself, or in the case of providing the retroreflective member at the opposite edge of the effective region, and using the shadow in the case of the object interrupting the light, the retroreflective light, then, returns back through the same path as the projected light, so that it is necessary that the light source which projects the light in a fan shaped projection pattern and the light-receptive sector to receive the retroreflective light be provided as closely as possible. In recent years, material which has excellent retroreflective characteristics has become available, so that the efficiency of light can be improved greatly by placing the projection pattern and the light-receptive pattern close together. Then, it is possible to arrange that the light projection sector and the light-receptive sector be completely coincided by using the half mirror or the reflective mirror with a slit as in the cases of FIG. 9 or FIG. 10 respectively. However, in these cases there is a problem of aforementioned attenuation of the light, or only a portion of the light is effectively received.

In general, a point light source and a cylindrical lens can be used to form a fan shaped projection pattern. For the light component at a surface perpendicular to the projected surface of the fan shaped projection pattern, parallel rays are ideal.

As an example of optical means to realize a so-called electronic blackboard, which has a large input surface, there is Japanese Patent Application Laid-Open No. H11-85377. In this example, a laser beam is used as the light source, and a polygon mirror conducts scanning on the blackboard. A defect in this kind of device is that there is a difficulty to determine the position of the optical unit and to adjust its angle. To solve such a problem of having difficulty to adjust the attachment angle of an optical unit in such devices, Japanese Patent Application Laid-Open No. H11-85399 suggests fine adjustment of the height and inclination of the optical unit with a screw.

The U.S. Pat. No. 4,107,522 can be cited as an example of using a stand-alone optical unit for detecting the object. This is to realize a security system, in which one light emitting diode is used for the projection sector.

In recent years, a so called input/output consolidation type coordinate input device has been realized. Here, the input surface of the coordinate input device and the display surface, such as, the liquid crystal display device are caused to be placed one over the other. Among the input/output consolidation type coordinate input devices, an electromagnetic induction system has been used for the one which can input handwriting letters by using a pen. In this case, antennas for detection of electromagnetic flux are provided in the back of the liquid crystal display. For the one that can be operated by a finger, it has transparent touch panel deployed before the display device. The touch panel uses a matrix electrode system with a transparent conductive sheet, or uses a system to detect the interruption of a plurality of light beams aligned vertically and horizontally.

In the optical units illustrated in FIG. 9 or FIG. 10, or the system to specify the position of the object by using light as proposed in Japanese Patent Application Laid-Open No. S62-5428, a reflective mirror is used to irradiate light. This reflective mirror cannot project an appropriate amount of light onto the surface of the detecting region without conducting a precise adjustment. As the detecting region gets larger, a slight deviance in the attachment angle of the reflective mirror at one edge is amplified as a large deviance at the other edge of the detecting region, thereby making the adjustment extremely difficult. Further, in the case of using a point light source and a lens as a means for projection, a fine adjustment of respective positions is required. With the reflective mirror added to the scene, they influence each other, causing complex adjustment to be required for the actual assembly task.

This reflective mirror, in order to guide the reflected light to the photoreceptor, requires the provision of a space such as a slit or the like, or requires the reflective mirror itself to be composed of the half mirror, so this system has a problem of producing a loss of the light. For example, in the case that the reflective mirror is composed of a half mirror, and the light from the point light source reflected at a 90 degree angle by the half mirror is reduced to half of the light quantity, and the light received by the linear photoreceptor after the reflected light from the retroreflective member passes through the half mirror is reduced to half again, producing altogether, ¾ of the light loss.

Also, to get enough quantity of light with only one LED, as is disclosed in the U.S. Pat. No. 4,507,557 and the U.S. Pat. No. 4,107,522, a high power and expensive light emitting diode is required, and a special diode with broad directivity is required. Further, in the case of Japanese Patent Application Laid-Open No. H9-319501, a point light source of LED and a cylindrical lens are used for the light source, which require a very delicate adjustment.

Further, in the case of Japanese Patent Application Laid-Open No. H11-85377, wherein a laser beam is used, an expensive laser diode is required, and a special attention must be paid in the handling of the laser beam. Further, in this system, as a polygon mirror is rotated to scan the laser beams, a physical mechanism for rotation and a motor to rotate it are necessary, thereby causing it difficult to make the optical unit itself compact.

SUMMARY OF THE INVENTION

The present invention provides an optical unit for detecting object, which does not use a reflective mirror or a lens as used in the prior art, and does not require a delicate adjustment of the position, and is realized at a low price, and it also provides a coordinate input apparatus using such optical unit.

According to the present invention, there is provided an object detecting optical unit for detecting a direction or a position of an object, which is placed on a detecting plane surface and irradiated by light, by detecting existence or non existence of a retroreflective light reflected by a retroreflective member, the optical unit comprising:

a light projection means having a plurality of light sources and a plurality of lenses which correspond to the light sources, wherein the plurality of light sources and the plurality of lenses are arranged in such a manner as to form a fan shaped projection pattern parallel to the detecting plane surface, the projection pattern being as if projected from a virtual one point light source; and a light receiving means having a slit, or a lens and linear photoreceptive group, wherein the slit or lens and the linear photoreceptive group are arranged in such a manner as to form a light receiving pattern with a view field corresponding to the fan shaped projection pattern formed by the light projection means.

By configuring a plurality of point light sources and a plurality of lenses to form a virtual one point light source, a stronger point light source is realized. The point light source used here is meant for the point light source in the case of the fan shaped light seen in a two-dimensional plane, and not for the point light source seen in three-dimensional space.

The projection means is formed by a plurality of light emitting diodes. A light emitting element in each light emitting diode forms one of the plurality of light sources. A transparent package of each light emitting diode forms one of the plurality of lenses.

The light emitting diode is usually enclosed in a clear resin package, which has a lens function. Such light emitting diodes are arranged in a fan shape to attain a projection pattern close to the ideal pattern.

Further, the plurality of light sources and lenses may well be arranged in such a way that each center of their optical axis, projected from each light source through a lens, corresponds to the optical axis of the projected pattern, wherein an assembled location at one point in the back of the light sources is made to be the virtual point light source and as if a fan shaped projection pattern is projected from thereat. It is also possible to make an arrangement by substituting the assembled location at one point in the back of the plurality of lenses with an assembled location at one point in front of the lenses, the one point being the virtual point light source to form a fan shaped projected pattern from there.

The projection means can be provided to either the topside or the bottom-side of the detecting means with a slight deviation to the perpendicular direction in relation to the aforementioned detecting plane. Further, the projection means may well be provided to both the top and bottom sides to increase the projection amount as a whole.

Further, the coordinate input apparatus in accordance with the present invention is constituted by at least the two optical units for detecting the object, each of the optical units being provided to its predetermined position, direction of the object being calculated by each of the optical units, thereby calculating the coordinates of the object by the triangulation principle, and inputting the coordinate information into an information processing apparatus. In this way, the accurate detection of the coordinates of the object becomes possible.

Further, the coordinate input apparatus in accordance with the present invention comprises a display device for displaying the information outputted from the information processing apparatus, the display device being provided right underneath the detecting plane. By configuring the light source of the optical unit in such a way that the plurality of point light sources are as if they are one point light source, it has become possible to realize an input/output consolidation type coordinate input apparatus combined with a large size display device at low cost, whereas conventional optical units for such a large size consolidation type device have been very expensive.

BRIEF DESCRIPTION OF THE DRAWINGS

The above and other objects, features and advantages of the present invention will be apparent from the following description of preferred embodiments of the invention explained with reference to the accompanying drawings, in which:

FIG. 1 is a diagram schematically showing a configuration of an object detecting optical unit in accordance with an embodiment of the present invention, wherein

FIG. 2 is a diagram showing the optical principle of the object detecting optical unit in accordance with the present invention, wherein

FIG. 6 is a diagram showing an example of an arrangement for the light emitting diode group in the object detecting optical unit in accordance with the present invention, wherein

DESCRIPTION OF THE PREFERRED EMBODIMENTS

Reference will now be made in detail to the preferred embodiments of the present invention, examples of which are illustrated in the accompanying drawings.

Figure 1A:
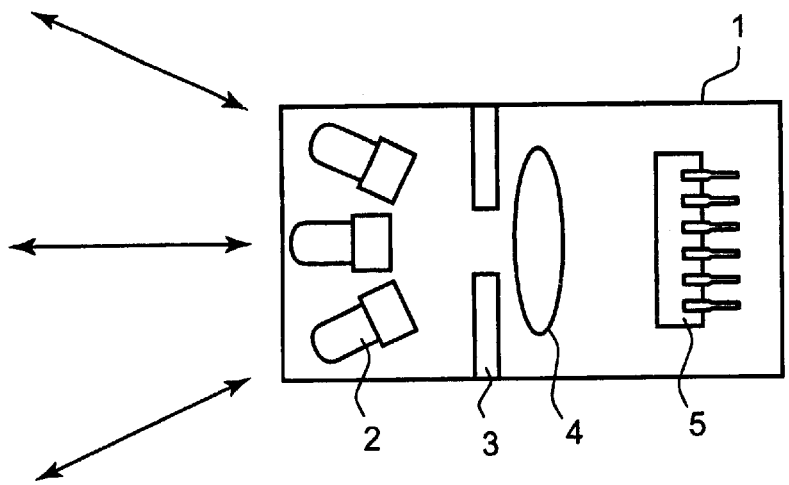
FIG. 1(a) shows its plane view.
Figure 1B:
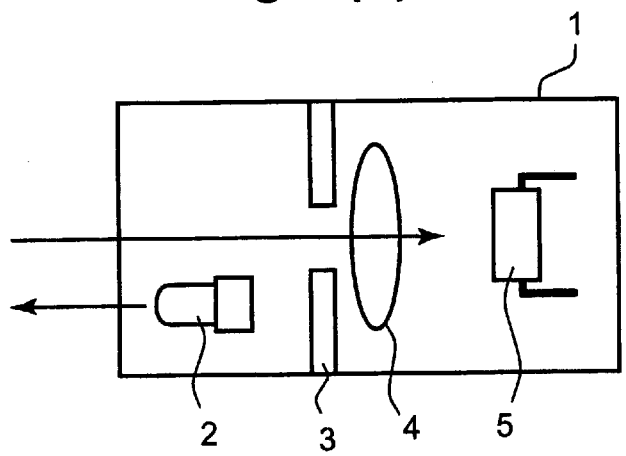
FIG. 1(b) shows its side view.
Figure 1C:
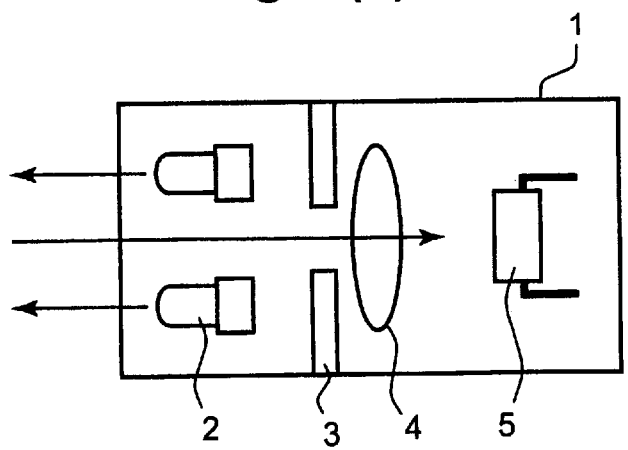
FIG. 1(c) shows a side view in the case that the light emitting diode group is assigned to both directions, above and below the light path of the photoreceptive unit.

FIG. 1 is a diagram schematically showing a configuration of the object detecting optical unit 1 in accordance with an embodiment of the present invention. FIG. 1(a) is its plane view, FIG. 1(b) is its side view, and FIG. 1(c) is a side view of an optical unit in accordance with other embodiments. The optical unit 1 consists of a plurality of light emitting diodes 2 arranged in a fan shape as the light source of the projection sector, a light interruption board 3 which interrupts direct light from the light source, a lens 4 (or a slit), and a photoreceptive sector comprised of a linear photoreceptive array 5. In this example, a linear CCD is employed as the linear photoreceptive array. As shown in FIG. 1(b), the light emitting diode 2 is slightly altered to a perpendicular direction, and placed on the downside of the linear photoreceptive array 5. The lens 4 and the linear photoreceptive array 5 are arranged in such a way as to form a fan shaped photoreceptive pattern with a view field corresponding to the fan shaped projection pattern that the plurality of light emitting diodes 2 form.

In the case of the object detecting optical unit which has an interruption system to detect the direction of the object by first placing a retroreflective member at the opposite edge of the effective region, and uses the object's shadow in the case that the light is interrupted by the object, the projected light from the light emitting diode 2 of the optical unit 1 is incident on the retroreflective member (not shown) provided at the opposite side from the optical unit 1, while the detecting position being in the middle. A typical retroreflective member is available as a retroreflective sheet in which a number of small clear beads are imbedded. Especially, in recent years, there exist some members with excellent retroreflective characteristics even when the light comes in at a low angle, it is still returned straight back to the direction the light came from. The light which came into the retroreflective member is retro-reflected to the direction in which it came from, and comes into the linear photoreceptive array 5 via the lens 4. In the case that an object exists on the detecting plane, the object interrupts a portion of the light path of a fan shaped projection pattern projected from the light emitting diode 2 of the optical unit 1. The direction of this shadow can be detected from the distribution of the output signals of the linear photoreceptive array 5, and by detecting the direction of this shadow, the direction of this object can be measured.

In the case that a retroreflective member is provided to the object itself and the retroreflective light is used, the projected light from the light emitting diode 2 of the optical unit 1 comes into the linear photoreceptive array 5 via lens 4 when there is the object by which the light which came into the retroreflective member provided to the object is retro-reflected. The direction of this reflected light from the object, which possesses the retroreflective member, can be detected from the distribution of the output signal of the linear photoreceptive array 5, so that by detecting this direction, the direction in which the object exists can be measured.

Further, it is possible to increase the total quantity of the projected light by arraying the emitting diodes 2 arranged in a fan shape to both the topside and the bottom side of the linear photoreceptive array 5, as shown in FIG. 1(c). Preferably, the number of the light emitting diodes provided on the topside and the number of the light emitting diodes provided on the bottom side are the same, having both of them arranged in the same kind of fan shape.

Figure 2A:
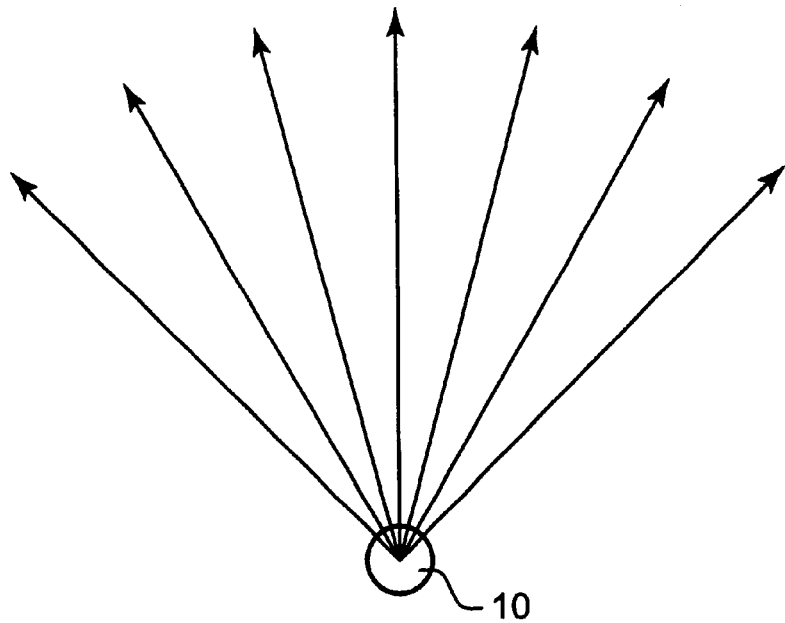
FIG. 2(a) shows the light projected from the point light source.
Figure 2B:
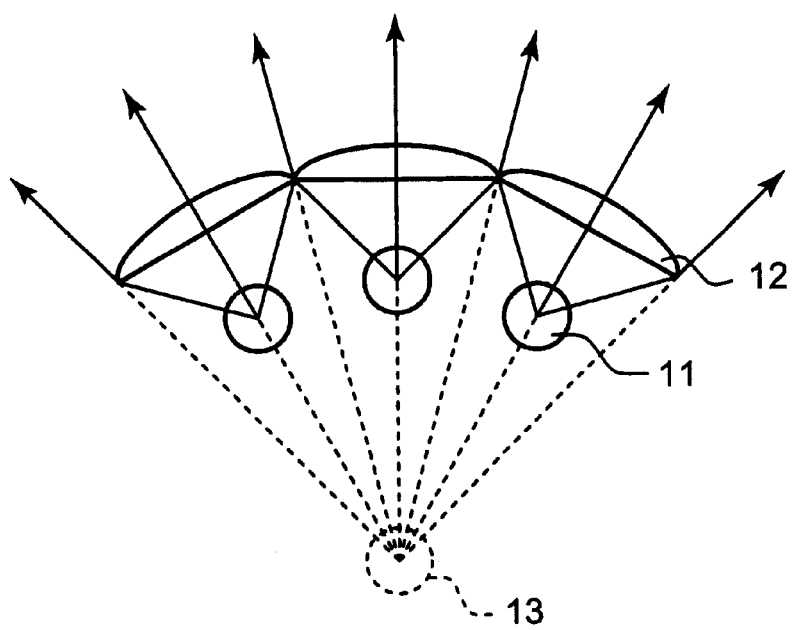
FIG. 2(b) shows a projection pattern in the case that the plurality of point light sources and lenses are arranged in such a way as to project light equivalent to the light projected from a virtual point light source.

FIG. 2 illustrates the principle of forming a fan shape projection pattern, as if the pattern is projected from a one point light source. The light from three light sources is synthesized to create a virtual point light source. FIG. 2(a) shows a projection pattern projected from the point light source 10, and FIG. 2(b) shows the plurality of point light sources 11 and lens 12 being arranged in a fan shape in such a way to form a projection pattern as if the pattern is projected from the virtual point light source 13. As shown in FIG. 2(b), the light sources 11 and the lenses 12 are provided on the same plane in such a way as to form a fan shaped projection pattern, which has the same function as if projected from a virtual point light source 13, which is located at the point where the centers of the light flux of the projected light via lenses 12 emitted from the plurality of light sources 11 are concentrated at one spot in the back of the plurality of light sources 11 and lenses 12. By this configuration, the quantity of the projected light increases as compared to the case where only one light source is used, thereby making the detection of the object in a larger region possible.

Figure 3:
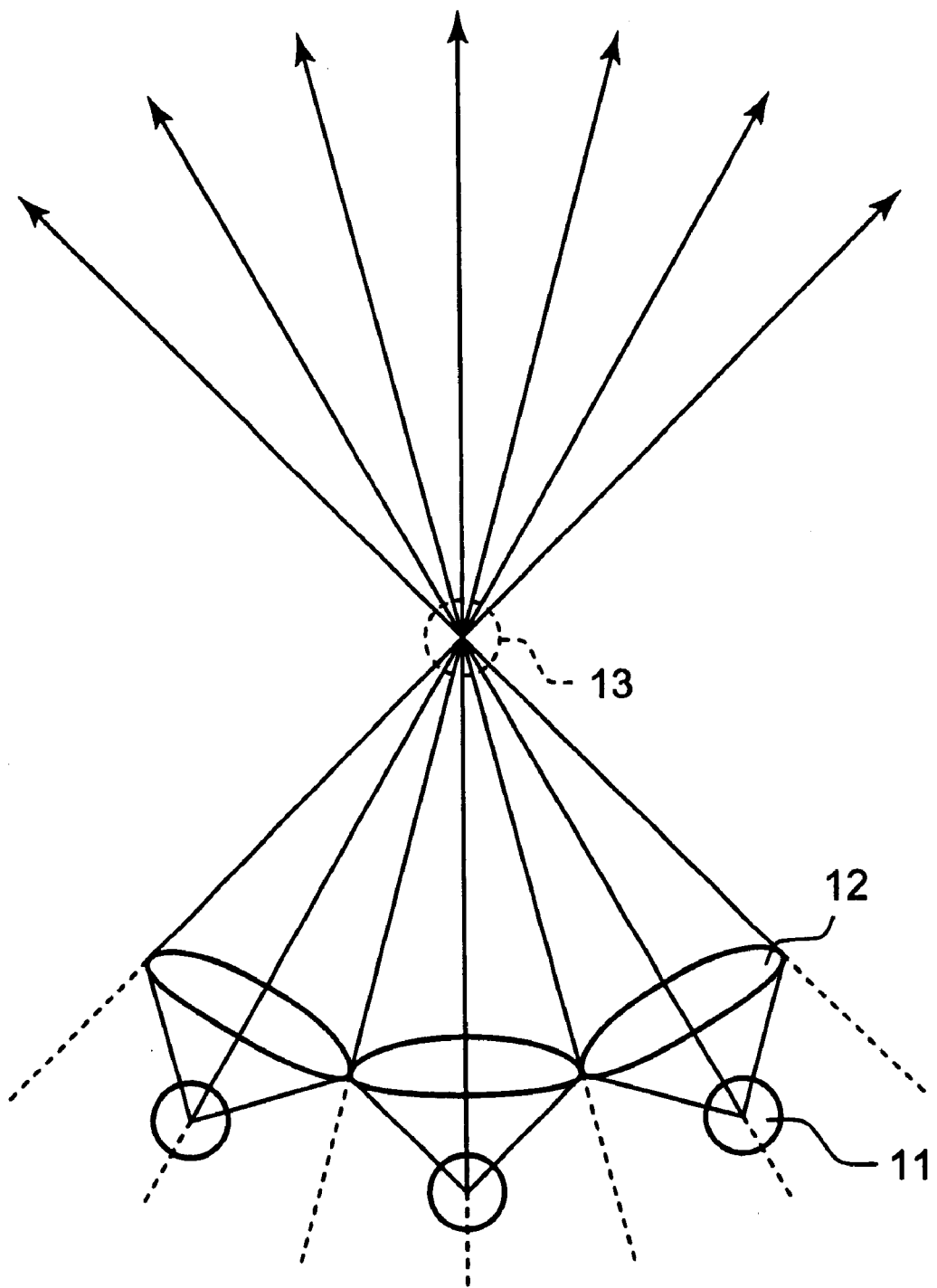
FIG. 3 is a diagram showing the projection pattern by another configuration for the object detecting optical unit in accordance with the present invention wherein the plurality of point light sources and lenses are arranged in such a way as to project light equivalent to the light projected from a virtual point light source.

FIG. 3 illustrates an example of arrangement opposite from the case in FIG. 2(b), in which the light flux of the light sources 11 and the lenses 12 are focused at one spot in the front, having this one spot as the virtual light source 13, and forming a fan shaped projection pattern as if the pattern is projected from the virtual point light source 13. Preferably, in this case, the lenses 12 should be condensers, and the point light sources 11 and the lenses 12 are arrayed on the single plane in such a way as to focus the light condensed by each lens at the virtual point light source 13.

Figure 4:
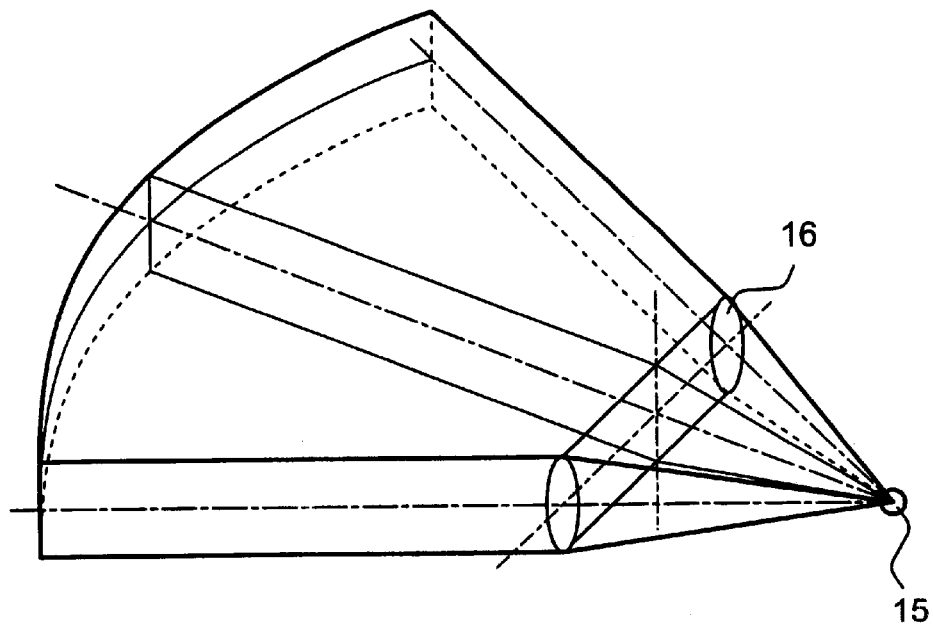
FIG. 4 is a perspective view of the object detecting optical unit in accordance with the present invention, showing that the light from the point light source becomes a fan shape by a cylindrical lens.

FIG. 4 is a perspective view to illustrate that light from a point light source 15 becomes a fan shaped projection pattern by a cylindrical lens 16. The point light source 15 in FIG. 4 indicates the same position as a virtual point light source 13 in either FIG. 2 or FIG. 3. The light projected from the point light source 15 becomes parallel light with respect to the detecting plane, and the projection pattern seen perpendicularly from the detecting plane becomes a fan shape. By making the projection pattern a fan shape, the light can be used more effectively than the case of not making the pattern a fan shape, thereby attaining an improvement on the reliability for the object detection.

Figure 5:
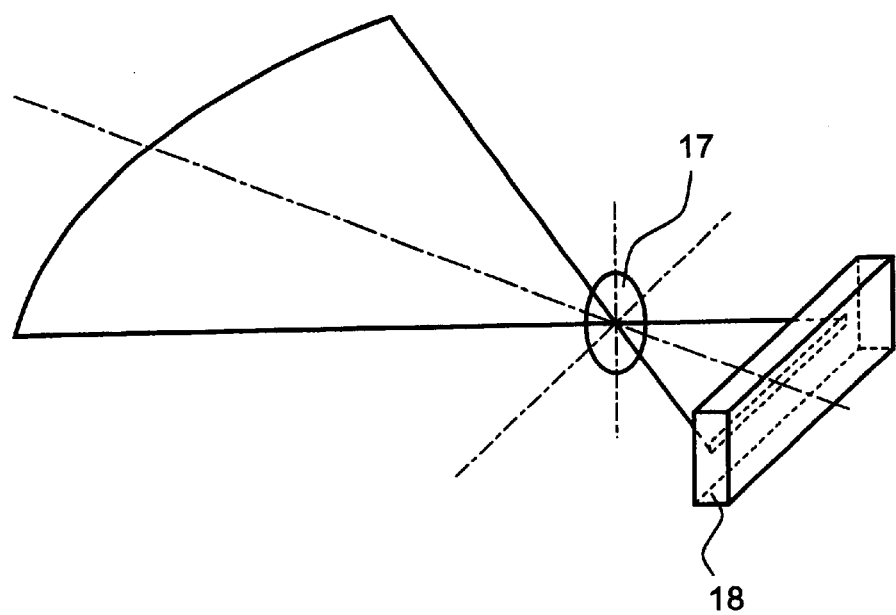
FIG. 5 is a perspective view of the object detecting optical unit in accordance with the present invention, showing that the photoreceptive pattern of the linear photoreceptive element array becomes a fan shape by using a lens.

FIG. 5 is a perspective view to illustrate that the photoreceptive pattern of the linear photoreceptive array 18 becomes the same fan shape as the projection pattern by the lens 17 (or a slit). For example, in the case that a retroreflective member is provided to the object, and the retroreflective light is used, the light which is retroreflected from the object comes into the linear photoreceptive array 18 via the lens 17. The reflected light from the object can be detected by the linear photoreceptor at the position corresponding to the direction in which the object exists, whereby the direction in which the object exists can be detected.

Figure 6A:
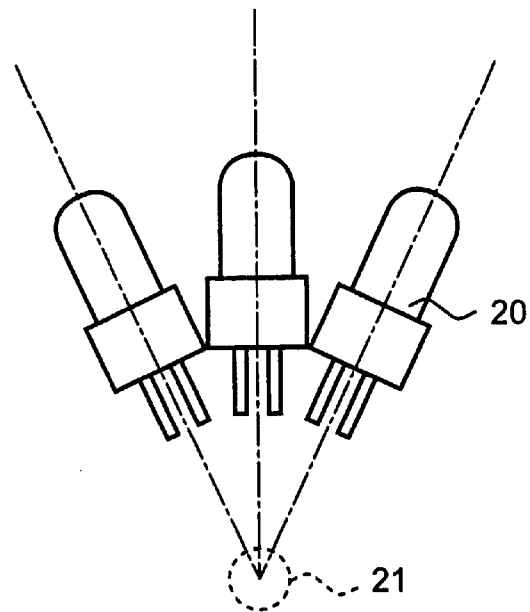
FIG. 6(a) shows the case that three units of light emitting diodes are used.
Figure 6B:
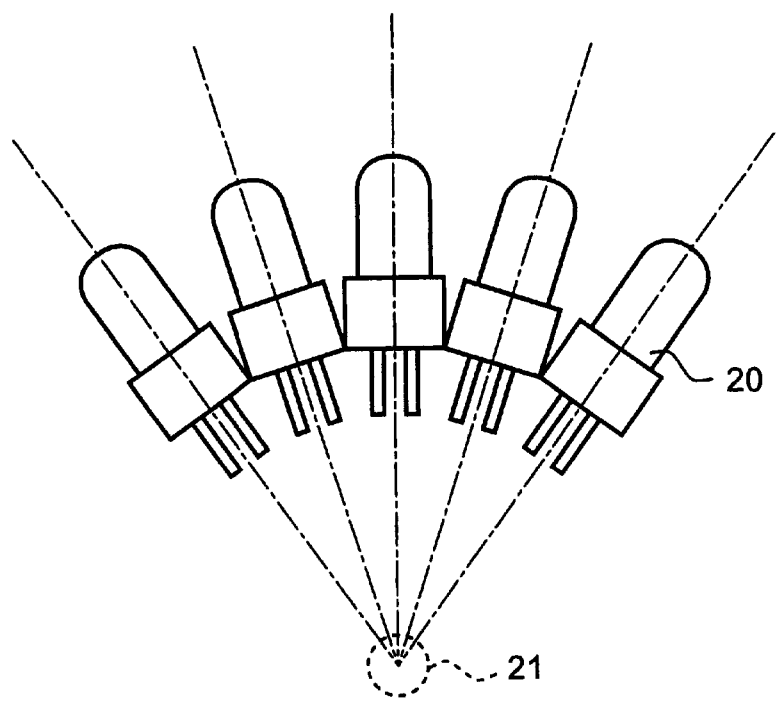
FIG. 6(b) shows the case that five units of the light emitting diodes are used.

FIG. 6 shows an example of arrangement in the case that the light emitting diodes are used for the projection sector of the object detecting optical unit in accordance with the present invention. FIG. 6(a) shows an example of using three light emitting diodes, and FIG. 6(b) shows an example of using five light emitting diodes. Needless to say, without being limited to these examples, any number of light emitting diodes can be combined as long as the combination can form a fan shaped projection pattern. Of course the number of the light emitting diodes can be increased or decreased depending on the light generation quantity and directivity of each light emitting diode. The point light source 11 in FIG. 2 or FIG. 3 corresponds to the light emitting element of the light emitting diode 20, and the lens 12 corresponds to the transparent package itself of the light emitting diode. Each light emitting diode is arranged in such a way that the center of the light flux projected from each light emitting diode 20 forms a projection pattern projected as if projected from the virtual point light source 21. The light emitting diodes used here can be, instead of a special kind, any common or general purpose light emitting diodes available at low cost.

Figure 7:
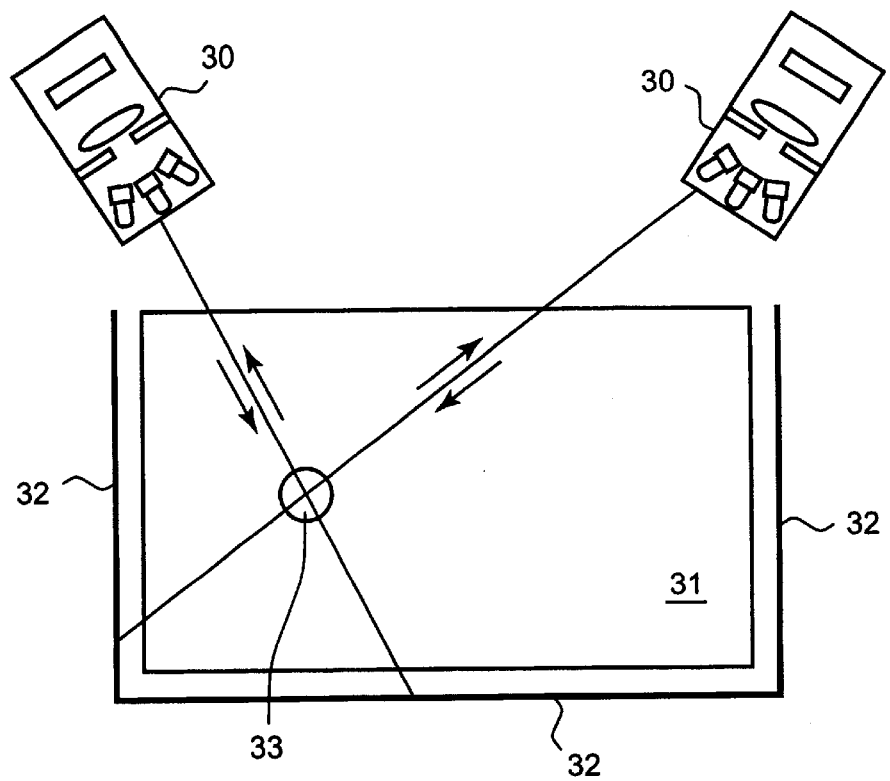
FIG. 7 is a diagram showing an example of the configuration for the coordinate input apparatus, which is provided with two sets of the object detecting optical units in accordance with the present invention.

FIG. 7 shows a coordinate input apparatus adopting the light interruption system, which uses object detecting optical units in accordance with an embodiment of the present invention. Two sets of optical units 30 which generate fan shaped projection patterns are provided at the right and left of the topside of the detecting plane 31. Also the retroreflective members 32 which possess retroreflective characteristics are provided at three locations, right, left and bottom sides of the detecting plane 31. When there is nothing placed on top of the detecting plane to interrupt the light, the light which comes into the retroreflective member 32 from the optical unit 30 through the topside of the detecting plane 31 retro-reflects to the same angle as it came in, passing through the reversed route and returns to the optical unit 30. On the other hand, when the object 33 is placed on top of the detecting plane 31, a portion of the light path is interrupted and the returning light to the optical unit fades out. By detecting the direction of this shadow from the distribution of the output signals of the linear photoreceptive array in the optical unit 30, the direction of the object, which interrupted the light, can be detected. In other words, through detecting the directions where the object exists by two sets of the optical units 30, which are placed at a predetermined distance from each other, the exact pointing position of the object 33 can be calculated by the triangulation principle. In this manner, the coordinate input apparatus, wherein the coordinate of the object is detected, and the detected coordinate information is inputted into a higher-level system information processing apparatus (not shown), such as a personal computer, can be realized.

Figure 8:
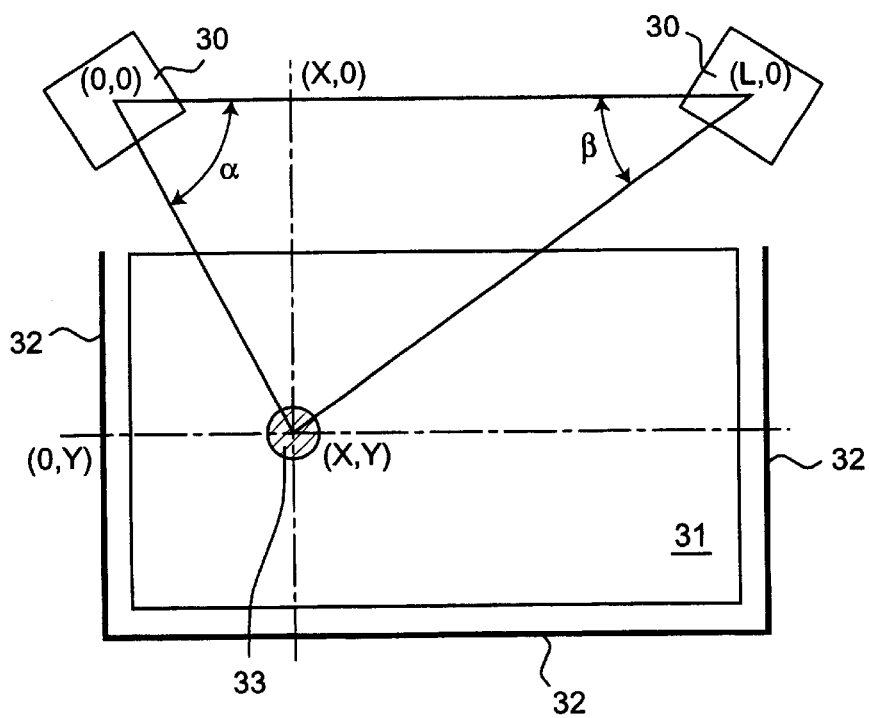
FIG. 8 is a diagram showing the method to calculate the coordinates in the coordinate input apparatus being provided with two sets of the object detecting optical units in accordance with the present invention.
Figure 9:
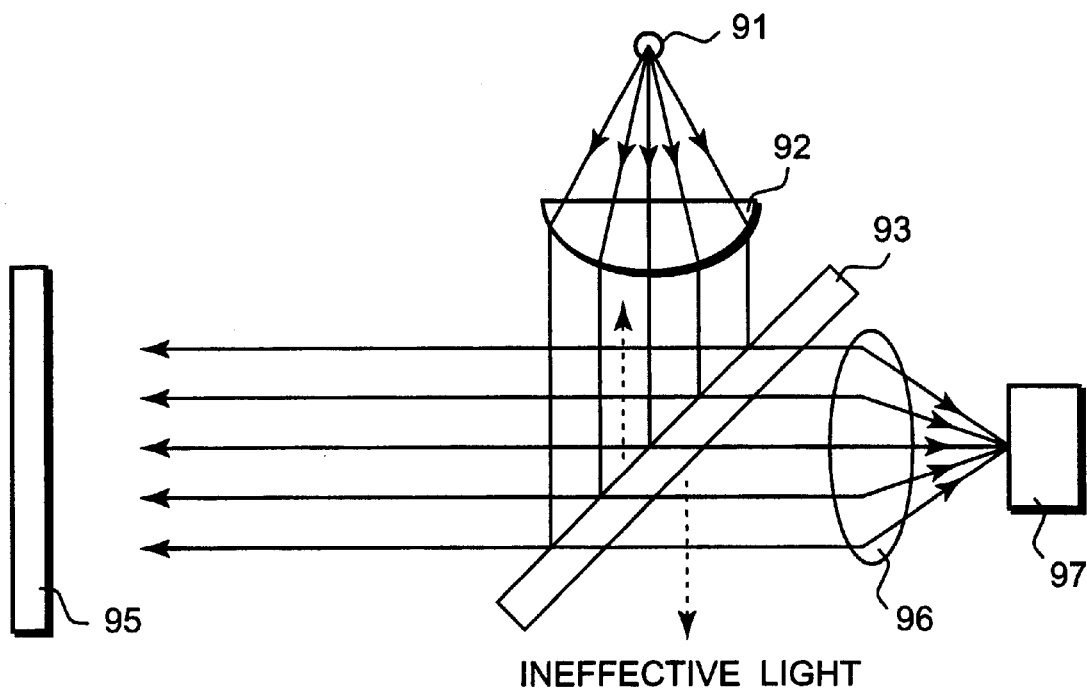
FIG. 9 is a diagram showing an example of a configuration of a projection sector using a conventional half mirror.
Figure 10:
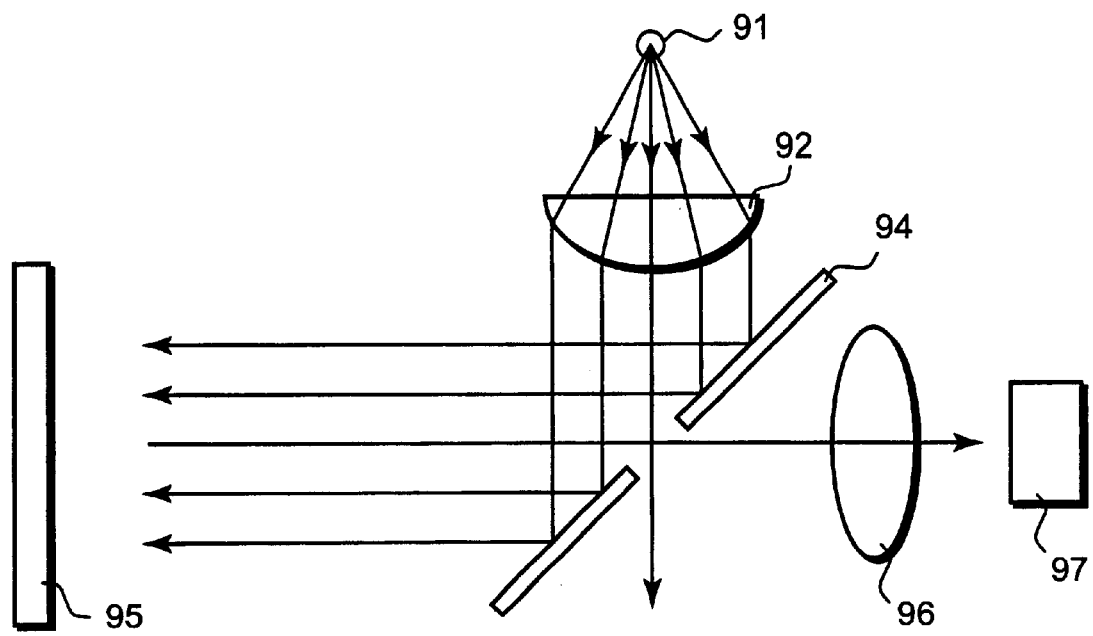
FIG. 10 is a diagram showing an example of a configuration of a projection sector using a conventional reflective mirror provided with a slit.

Now, the method to calculate the coordinates of the object based on the triangulation principle is shown in FIG. 8. First, the angles α and β when the object 33 is detected by the two optical units 30 shall be measured. Let the distance between the two optical units 30 be L, then the following equations (1) and (2) are established.

$$Y = X \cdot \tan\alpha \tag{1}$$

$$Y = (L-X) \cdot \tan\beta \tag{2}$$

Here, X and Y represent the position coordinates of the object.

Use the equations (1) and (2) to find X, then the following equation (3) can be established.

$$X = (L \cdot \tan\beta)/(\tan\alpha + \tan\beta) \tag{3}$$

By using these equations (1) and (3), once the angles α and β are detected, the coordinates (X, Y) of the object 33 on the detecting plane 31 can be calculated.

FIG. 7 is the example of providing the retroreflective members 32 at three locations, namely, right, left and bottom sides of the detecting plane 31. It is also possible to provide the retroreflective member to the object 33 itself, and to use the retroreflective light. In this case, the coordinate of the object can be measured by detecting the directions of the retroreflective light by the two optical units 30.

Further, it is also possible to provide a display device for displaying the information outputted from the higher-level information processing device such as a personal computer to the coordinate input apparatus using the object detecting optical unit as described in FIG. 7 and provide the detecting plane in an overlapping manner to the display device. The displaying on the screen of the display device is controlled by the higher-level system. A liquid crystal display, a plasma display, or a flat surface CRT display can well be used as the display device. The object detecting optical unit in accordance with the present invention employs the plurality of light emitting diodes, thereby having a large light generation output, enabling the unit to cope with a large sized display device.

As has been explained hereinabove, the object detecting optical unit or the coordinate input apparatus adopting the same, in accordance with the present invention, has little loss of projected light, and is capable of effectively conducting the position detection of the object placed on the detecting plane surface. Further, in the case of using the light emitting diode, projection related adjustment has become only for the adjustment of fixing the diode, thereby making conventional complex positional adjustments unnecessary. Further, the present invention enables easy access to a sufficient light quantity by simultaneously lighting the low cost light emitting diodes. Consequently, the input/output consolidation type device combined with a large size plasma display device or the like has become possible to be manufactured at low cost.

It is to be understood that this invention is not limited to the preferred embodiments and modifications described above, and that various changes and modifications may be made without departing from the spirit and scope of the invention as defined in the appended claims.

What is claimed is:

1. An object detecting optical unit for detecting a direction or a position of an object, which is placed on a detecting plane surface and irradiated by light, by detecting the existence or non-existence of a retroreflective light reflected by a retroreflective member, said optical unit comprising:

a light projection means having a plurality of light sources and a plurality of lenses which correspond to said light sources, wherein said plurality of light sources and said plurality of lenses are arranged in such a manner as to form a fan shaped projection pattern which is substantially parallel to said detecting plane surface, said projection pattern being as if projected from a virtual one point light source; and a light receiving means having a slit, or a lens and a linear photoreceptive group, wherein said slit or lens and said linear photoreceptive group are arranged in such a manner as to form a light receiving pattern with a view field corresponding to said fan shaped projection pattern formed by said light projection means.

2. An object detecting optical unit as claimed in claim 1, wherein said light projection means includes a plurality of light emitting diodes, said plurality of light sources each being formed of the light emitting element in each light emitting diode, and said plurality of lenses are each made integral with the respective light emitting diode.

3. A object detecting optical unit as claimed in claim 2, wherein said plurality of light sources and said plurality of lenses are arranged in a fan shape and disposed on a single plane in such a manner so as to form said fan shaped projection pattern with the center of each light flux projected from each light source via the lens and being focused at one rear point of said plurality of lenses, said fan shaped projection pattern being projected from said one rear point as said virtual one point light source.

4. An object detecting optical unit as claimed in claim 2, wherein said plurality of light sources and said plurality of lenses are arranged in a fan shape and disposed on a single plane in such a manner so as to form said fan shaped projection pattern with the center of each light flux projected from each light source via the lens being and focused at one front point of said plurality of lenses, said fan shaped projection pattern being projected from said one front point as said virtual one point light source.

5. An object detecting optical unit as claimed in claim 1, wherein said retroreflective member is disposed at the opposite side from said optical unit with said detecting plane being sandwiched between said object detecting optical unit and said retroreflective member, whereby, when said object interrupts the light path between said light projection means and said light receiving means in which the light travels back and forth, a direction of said object is detected by calculating the direction of the shadow from the distribution of output signals from said linear photoreceptive group.

6. An object detecting optical unit as claimed in claim 1, wherein said object carries said retroreflective member thereon, said retroreflective member functioning such that the direction of said object is detected by calculating the direction of the reflected light from the distribution of the output signals from said linear photoreceptive group when said irradiated light from said light projection means returns to said light receiving means by retroreflection from said object.

7. An object detecting optical unit as claimed in claim 1, wherein said light projection means is provided with a slight offset to a perpendicular direction to said detecting plane surface, and is located above or below said detecting means.

8. An object detecting optical unit as claimed in claim 1, wherein said light projection means is provided with a slight offset to a perpendicular direction to said detecting plane surface, and is located both above and below said detecting means.

9. A position coordinate input apparatus having at lease two sets object detecting optical units provided respectively at predetermined positions, each of said optical units conducting a calculation for the direction of an object placed on a detecting plant surface, thereby calculating the coordinates of said object using the triangulation principle, and then inputting the attained position coordinate information into an information processing device, each of said optical units comprising:

a light projection means having a plurality of light sources and a plurality of lenses which correspond to said light sources, wherein said plurality of light sources and said plurality of lenses are arranged in such a manner as to form a fan shaped projection pattern which is substantially parallel to said detecting plane surface, said projection pattern being as if projected from a virtual one point light source; and a light receiving means having a slit, or a lens and a linear photoreceptive group, wherein said slit or lens and said linear photoreceptive group are arranged in such a manner as to form a light receiving pattern with a view field corresponding to said fan shaped projection pattern formed by said light projection means.

10. A position coordinate input apparatus as claimed in claim 9, wherein said apparatus further has a display device having a screen for displaying the information outputted from said information processing device, and said detecting plane surface being provided in such a manner so as to overlap the screen of said display device.

* * * * *